United States Patent
Watanabe et al.

(10) Patent No.: US 10,298,454 B2
(45) Date of Patent: May 21, 2019

(54) COMMUNICATION PATH SWITCHING APPARATUS, METHOD FOR CONTROLLING COMMUNICATION PATH SWITCHING APPARATUS, AND COMPUTER PROGRAM PRODUCT

(71) Applicants: Kiwamu Watanabe, Kanagawa (JP); Yoshikazu Azuma, Tokyo (JP)

(72) Inventors: Kiwamu Watanabe, Kanagawa (JP); Yoshikazu Azuma, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 24 days.

(21) Appl. No.: 15/528,836

(22) PCT Filed: Nov. 9, 2015

(86) PCT No.: PCT/JP2015/005592
§ 371 (c)(1),
(2) Date: May 23, 2017

(87) PCT Pub. No.: WO2016/084314
PCT Pub. Date: Jun. 2, 2016

(65) Prior Publication Data
US 2017/0310545 A1 Oct. 26, 2017

(30) Foreign Application Priority Data

Nov. 25, 2014 (JP) .................. 2014-238158
Jul. 24, 2015 (JP) .................. 2015-146974

(51) Int. Cl.
*H04L 12/24* (2006.01)
*H04L 12/46* (2006.01)
(Continued)

(52) U.S. Cl.
CPC ...... *H04L 41/0816* (2013.01); *H04L 12/4633* (2013.01); *H04L 41/0803* (2013.01);
(Continued)

(58) Field of Classification Search
None
See application file for complete search history.

(56) References Cited

U.S. PATENT DOCUMENTS 9,038,151 B1 * 5/2015 Chua .................. H04L 45/02
709/223
2011/0314517 A1 12/2011 Yamato et al.
(Continued)

FOREIGN PATENT DOCUMENTS

JP 2015-084515 4/2015
JP 2015-122556 7/2015
(Continued)

OTHER PUBLICATIONS

International Search Report dated Dec. 15, 2015 in PCT/JP2015/005592 filed on Nov. 9, 2015.
(Continued)

*Primary Examiner* — Michael J Moore, Jr.
(74) *Attorney, Agent, or Firm* — Cooper & Dunham LLP

(57) ABSTRACT

A communication path switching apparatus in an application unit that executes a certain function of performing wireless communication with another communication apparatus, a data switching unit that forwards data for causing the application unit to execute the certain function, a control unit that makes the setting for causing the data switching unit to forward the data, and a virtual device unit that forwards the data forwarded from the data switching unit to the application unit based on the setting made by the control unit.

8 Claims, 12 Drawing Sheets

(51) Int. Cl.
*H04L 12/725* (2013.01)
*H04L 12/721* (2013.01)
*H04W 40/02* (2009.01)
*H04W 12/06* (2009.01)
*H04W 28/08* (2009.01)

(52) U.S. Cl.
CPC ............ *H04L 45/306* (2013.01); *H04L 45/38* (2013.01); *H04W 40/02* (2013.01); *H04W 12/06* (2013.01); *H04W 28/08* (2013.01)

(56) References Cited

U.S. PATENT DOCUMENTS

| | | | |
|---|---|---|---|
| 2013/0343393 | A1 | 12/2013 | Sugihara |
| 2014/0071969 | A1* | 3/2014 | Roeland ............... H04W 76/11 370/338 |
| 2015/0049631 | A1* | 2/2015 | Heron .................... H04L 45/02 370/254 |
| 2015/0078362 | A1 | 3/2015 | Kunieda et al. |
| 2015/0156122 | A1* | 6/2015 | Singh ...................... H04L 47/20 370/235 |
| 2016/0134611 | A1* | 5/2016 | Lapuh .................... H04L 63/08 726/1 |
| 2017/0048103 | A1 | 2/2017 | Azuma |
| 2017/0164212 | A1* | 6/2017 | Opsenica ............. H04W 12/06 |

FOREIGN PATENT DOCUMENTS

| | | |
|---|---|---|
| JP | 2015-220589 | 12/2015 |
| JP | 2016-009916 | 1/2016 |
| JP | 2016-012909 | 1/2016 |
| JP | 2016-086363 | 5/2016 |
| WO | 2012/120990 | 9/2012 |

OTHER PUBLICATIONS

Matias, Jon et al., FlowNAC: Flow-based Network Access Control, 2014 Third European Workshop on Software Defined Network(EWSDN) pp. 79-84 [online], Sep. 3, 2014 [Retrieved on Dec. 3, 2015], Retrieved from the Internet: URL:http://ieeexplore.ieee.org/xpls/abs_all.jsp?arnumber=6984056,<DOI:10.1109/EWSDN.2014.39>.
European search report dated Aug. 25, 2017 in connection with corresponding European patent application No. 15862681.2.
Yan Luo et al. "Accelerated virtual switching with programmable NICs for scalable data center networking", *Proceedings of the second ACM SIGCOMM workshop on Virtualized infrastructure systems and architectures (VISA '10)*, New York, 2010, pp. 65-72.
Suneth Namal et al. "SDN Core for Mobility between Cognitive Radio and 802.11 Networks" *Eighth International Conference on Next Generation Mobile Apps, Services and Technologies*, Oxford, 2014, pp. 272-281.
Jon Matias et al. "FlowNAC: Flow-based Network Access Control," *Third European Workshop on Software Defined Networks*, Budapest, 2014, pp. 79-84.

* cited by examiner

[Fig. 1]
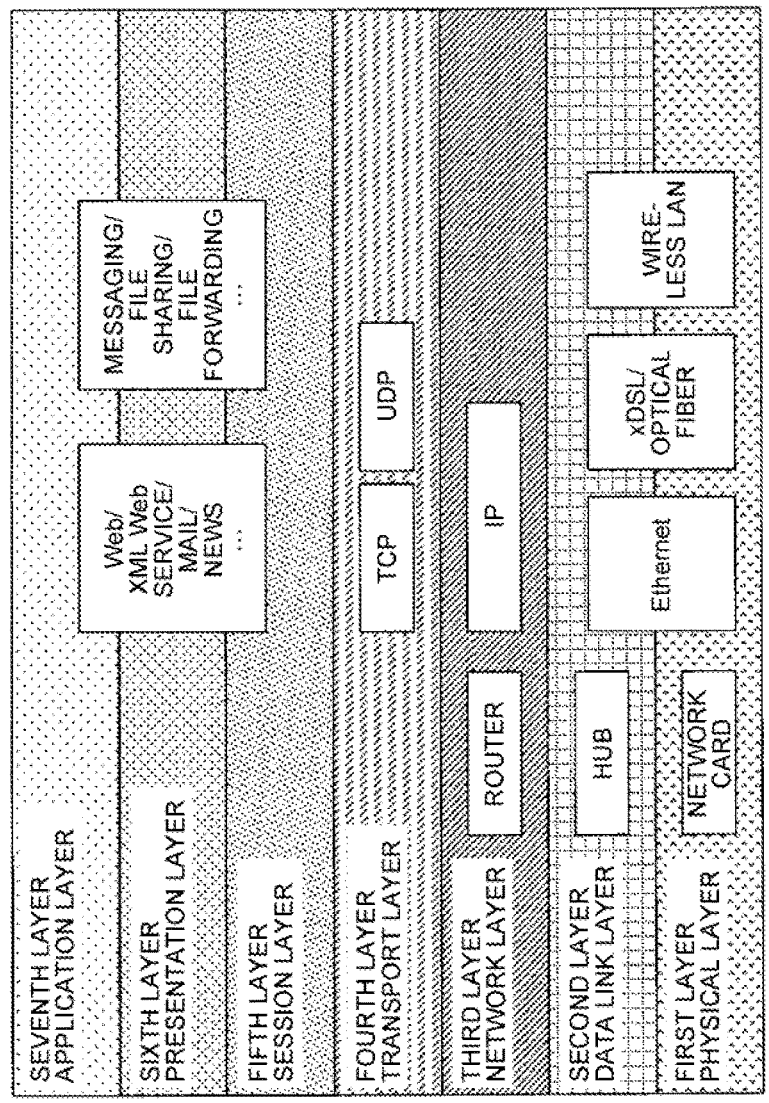
[Fig. 2A]
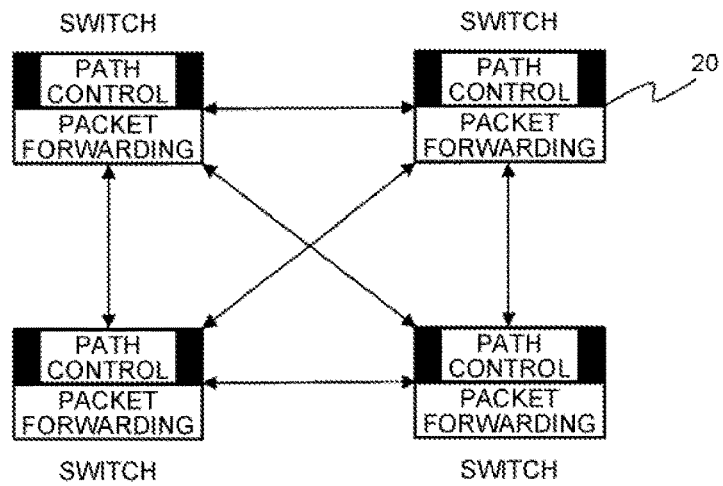

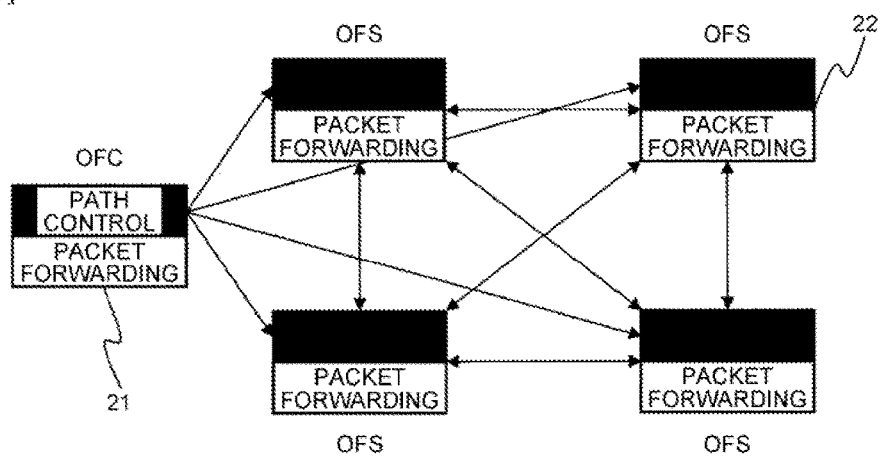

[Fig. 4]
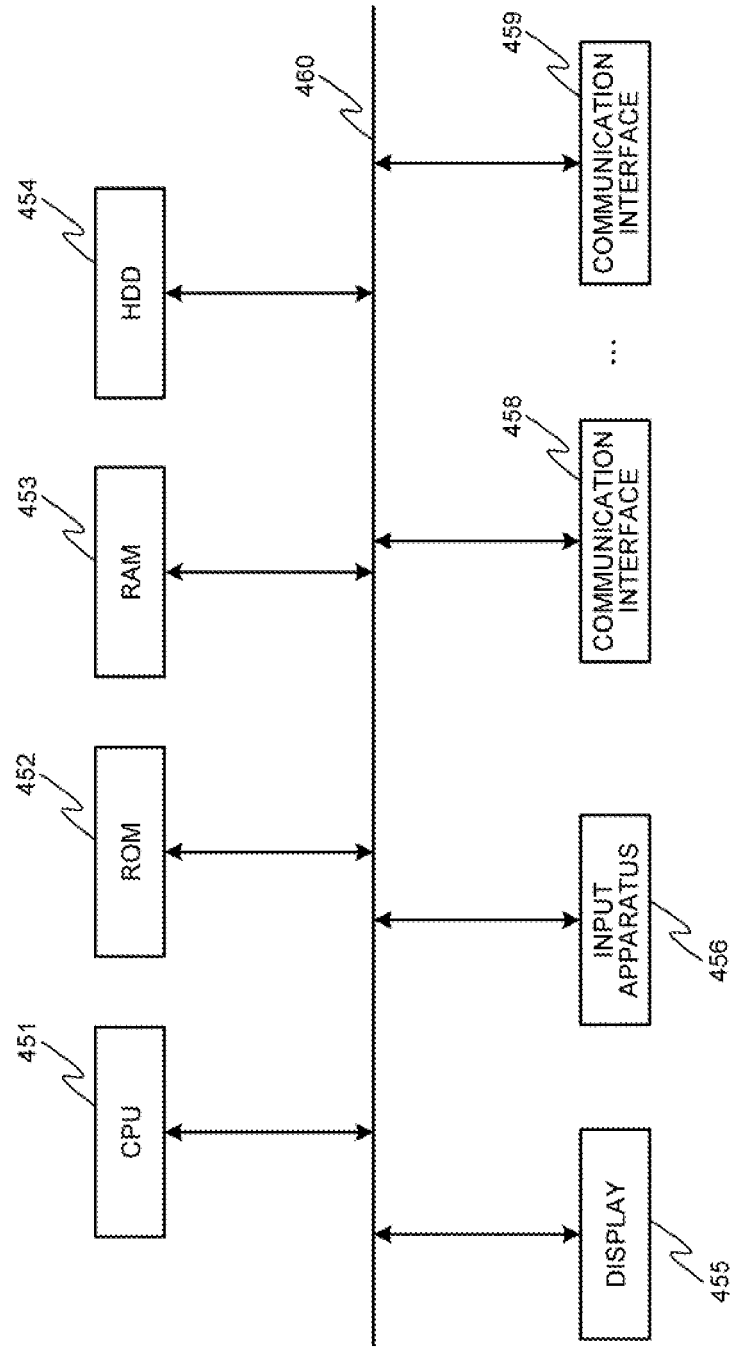

[Fig. 5]
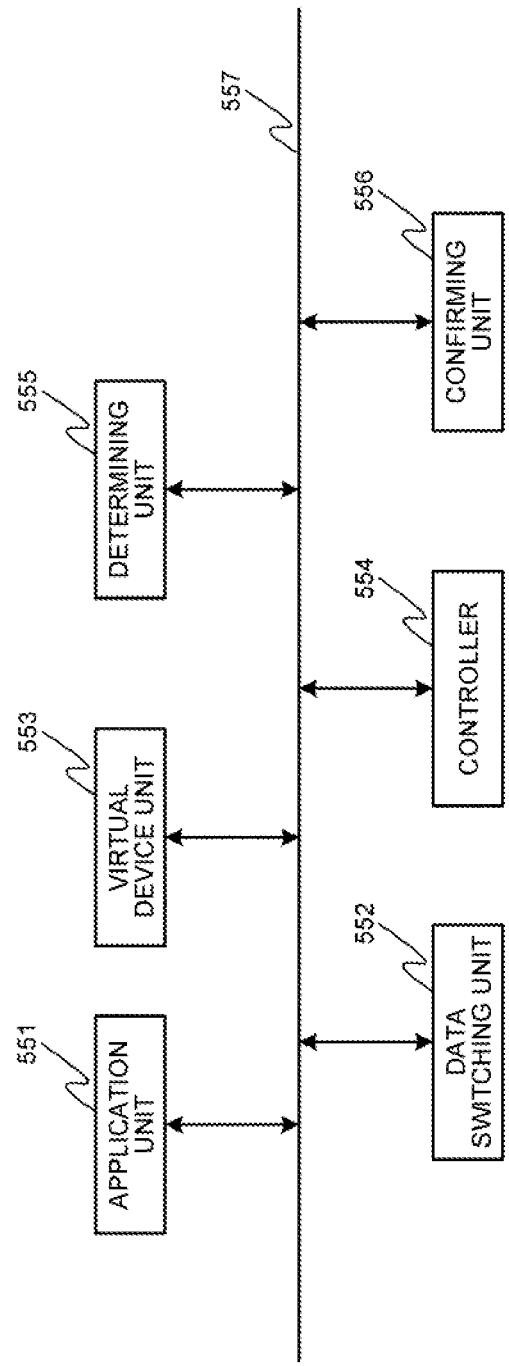

[Fig. 6]
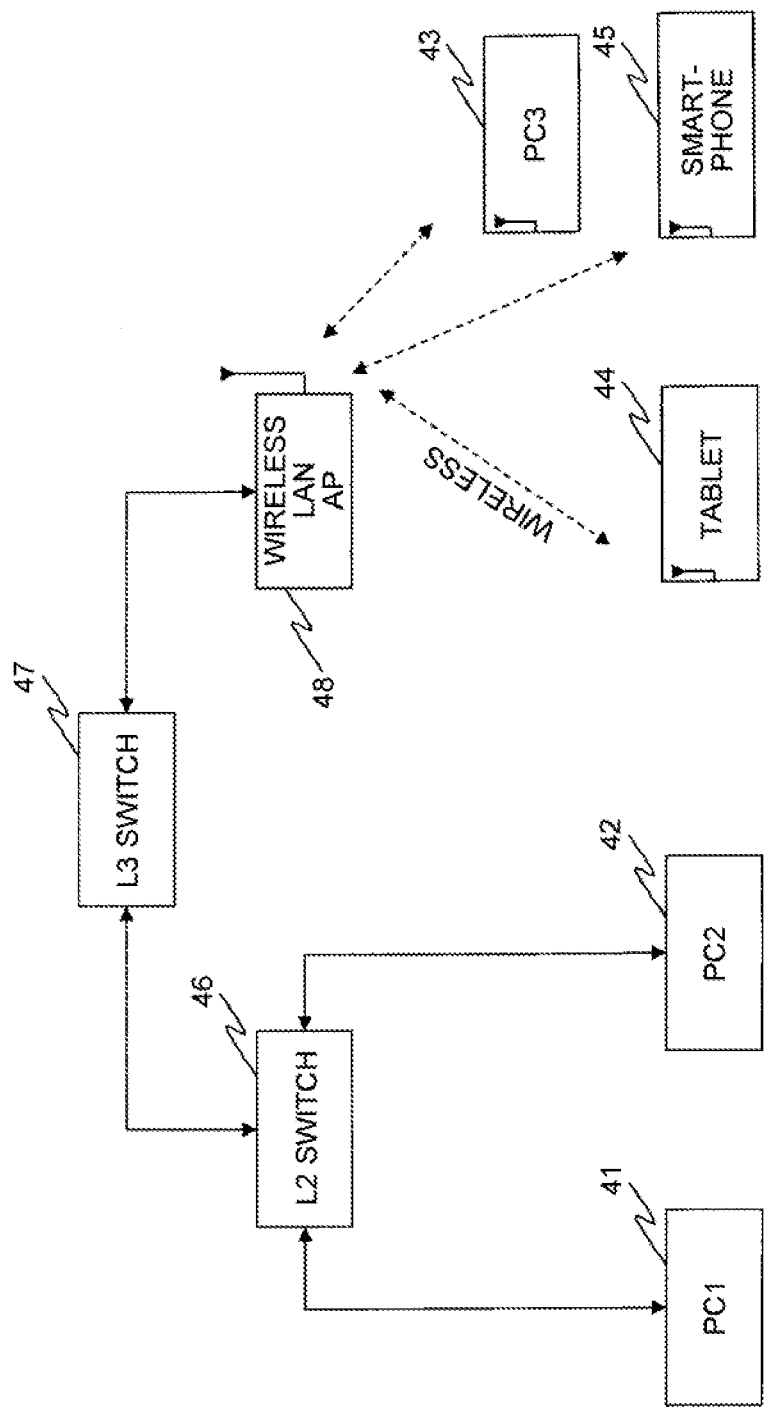

[Fig. 7]
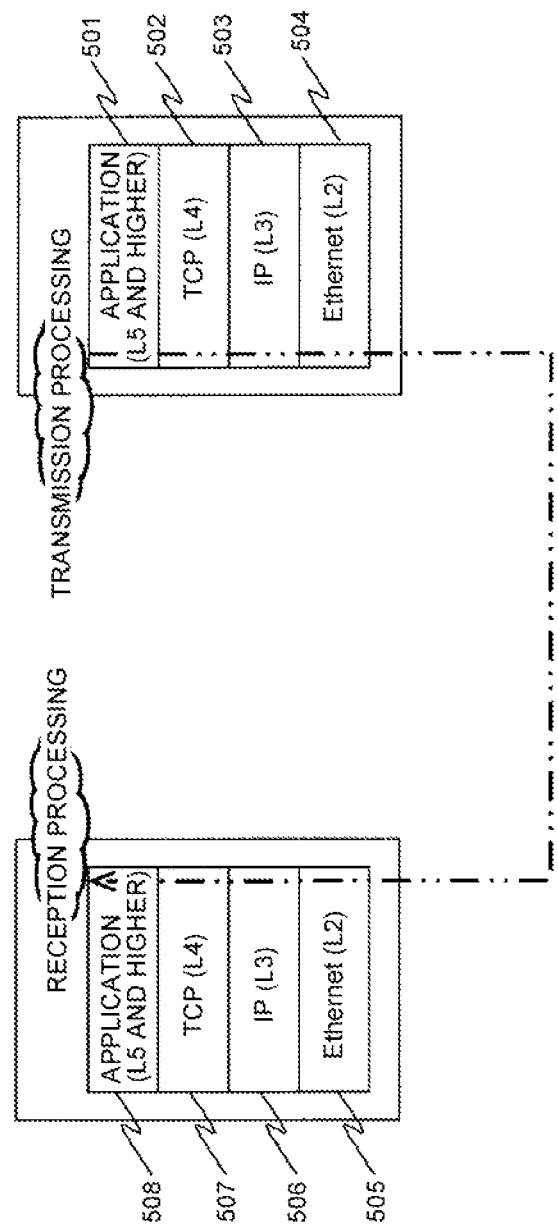

[Fig. 8]
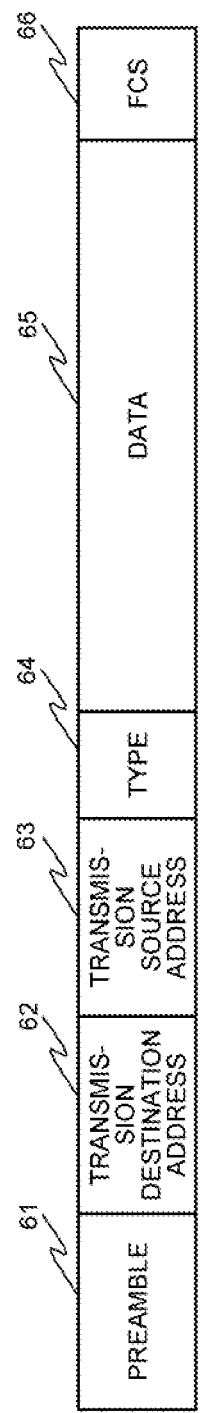

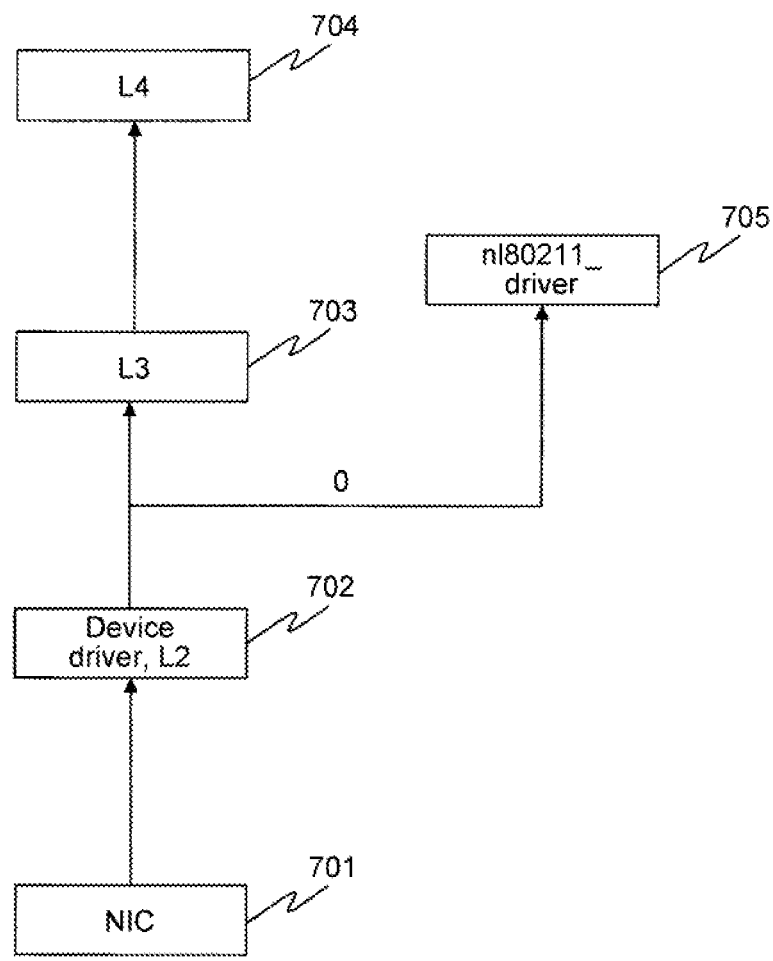
[Fig. 9]

[Fig. 10]
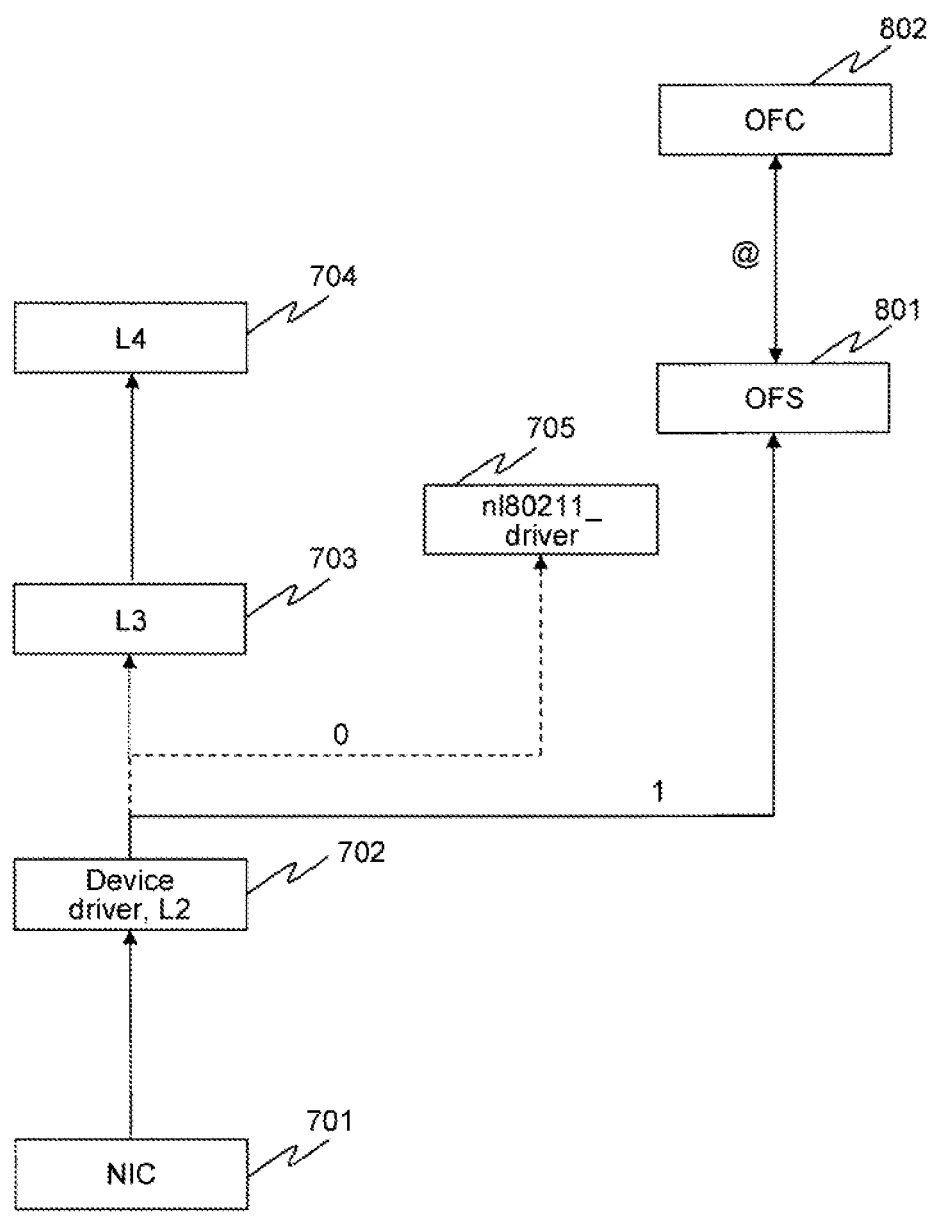

[Fig. 11]
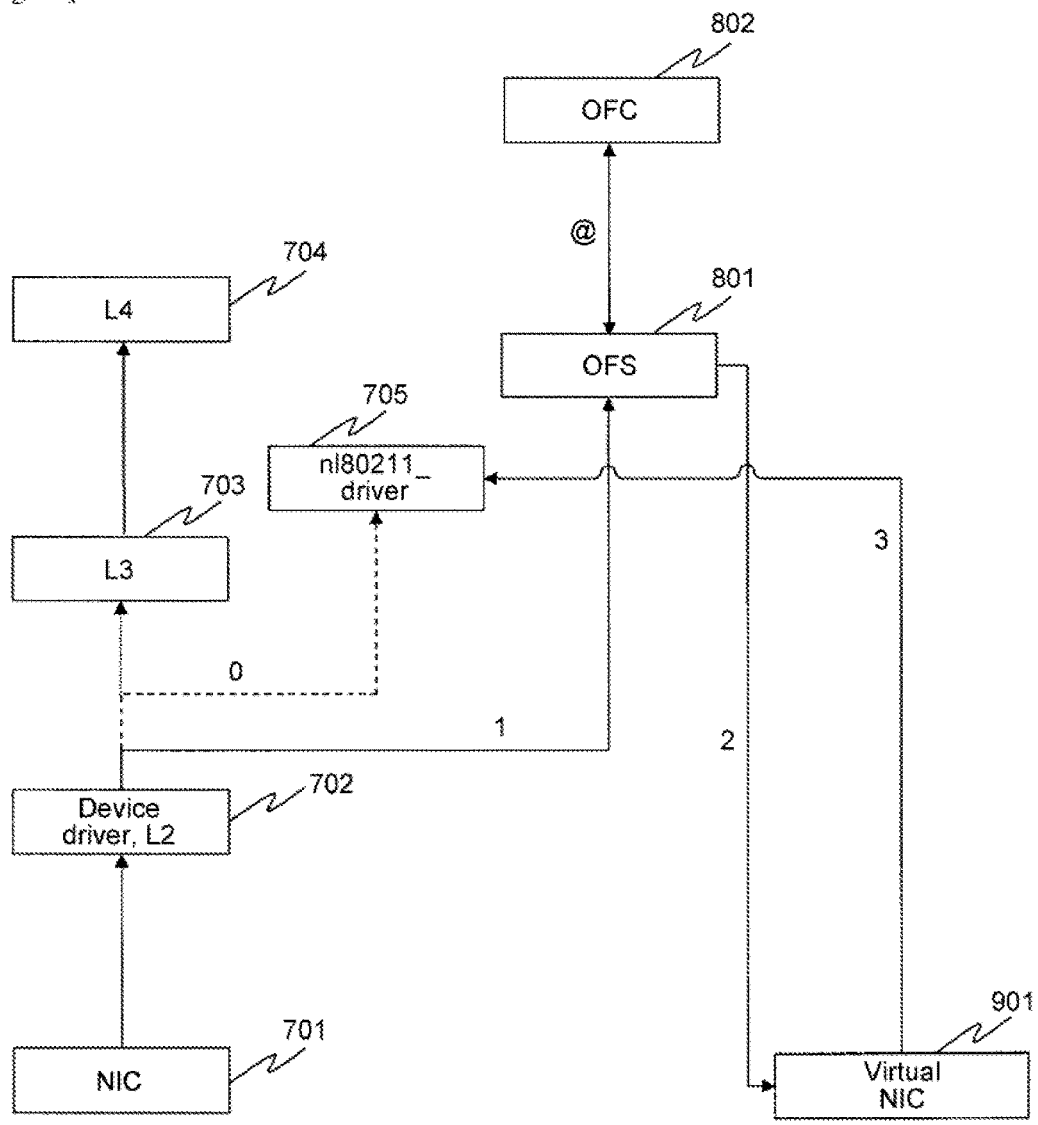
[Fig. 12]
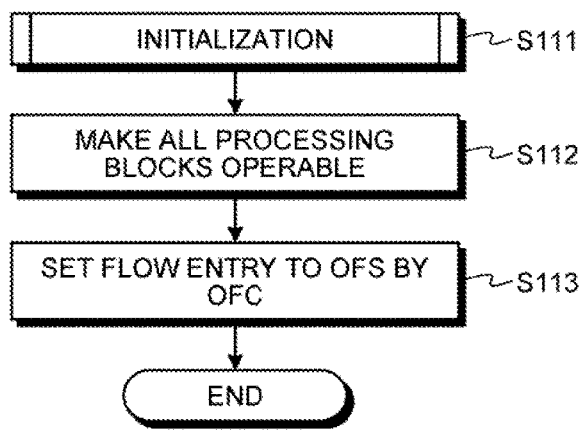

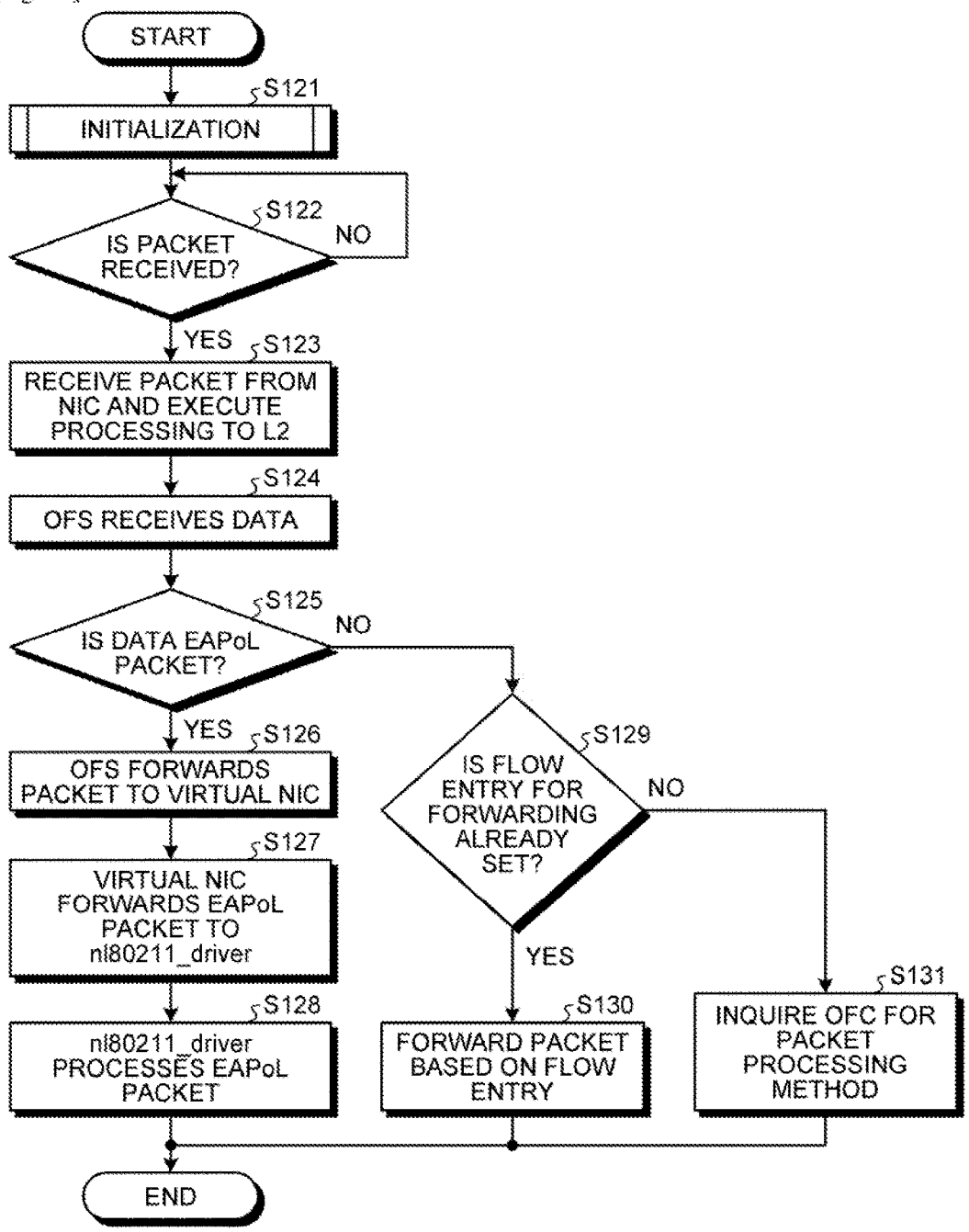

[Fig. 14]
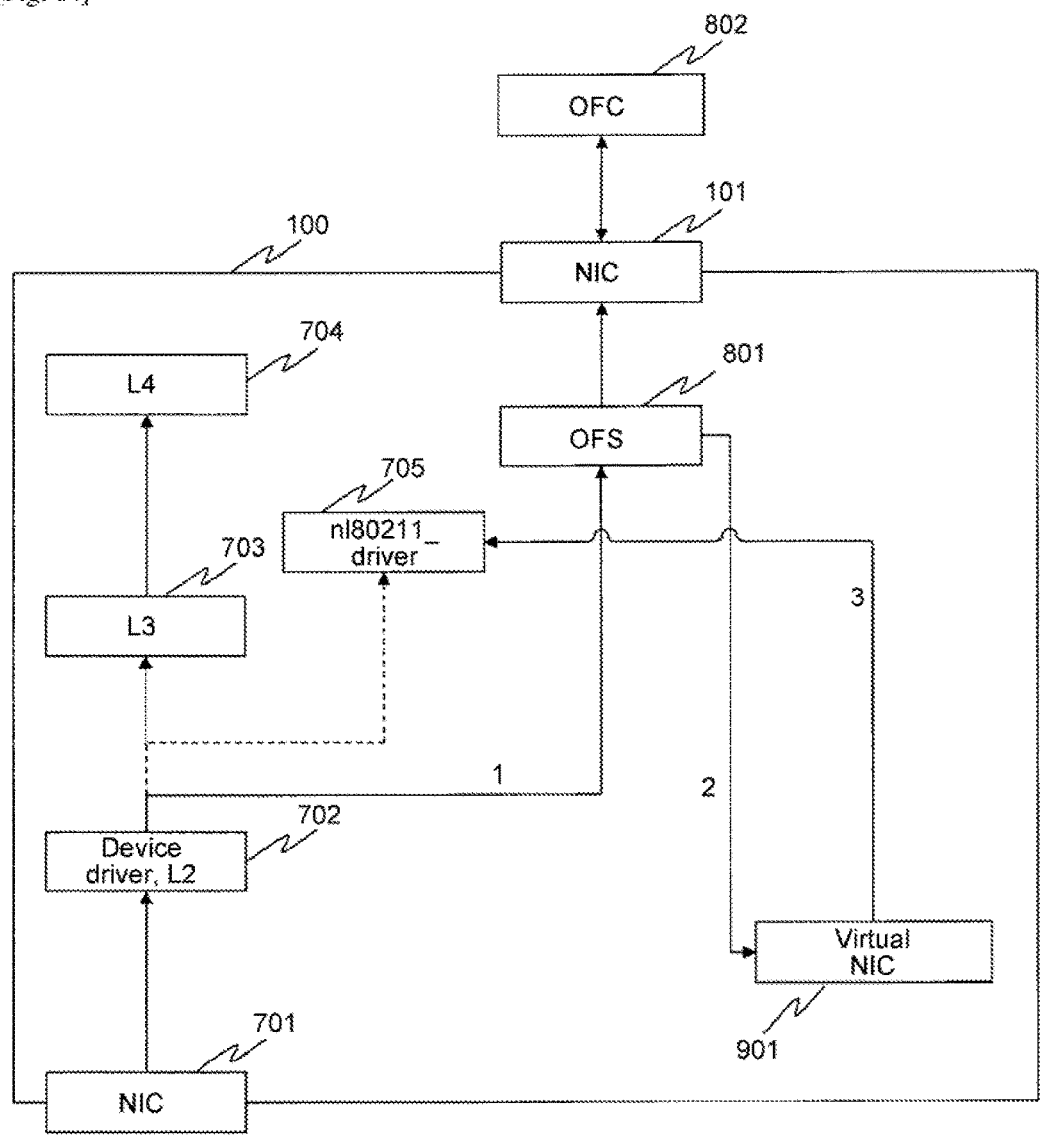

COMMUNICATION PATH SWITCHING APPARATUS, METHOD FOR CONTROLLING COMMUNICATION PATH SWITCHING APPARATUS, AND COMPUTER PROGRAM PRODUCT

TECHNICAL FIELD

The present invention relates to a communication path switching apparatus, a method for controlling a communication path switching apparatus, and a computer program product.

BACKGROUND ART

In a communication network from wide area communication such as public lines and medium-scale area communication such as a company premise local area network (LAN) down to short-distance communication connecting user terminals in an office room, a meeting room, and the like, packet communication based on the Internet Protocol (IP) is advanced and application thereof is expanded in all areas. Media transmitting an IP packet are substantially converging to Ethernet (registered trademark) for wire communication, and are substantially converging to a third generation (3G)/Long Term Evolution (LTE) system for long-distance wireless communication and to The Institute of Electrical and Electronics Engineers, Inc (IEEE) 802.11 wireless local area network (LAN) system, which is known as a nickname of Wireless Fidelity (Wi-Fi) for middle-distance and short-distance wireless communication.

The concept called a software defined network (SDN) has been gaining attention in recent years. The SDN literally means that operation of network is defined with software description, and includes, as major technical components receiving the most attention, virtualization of a network, and Open Flow Switching that is one of the methods and protocols for controlling the virtual communication and is open specifications independent of a vendor.

Open Flow (registered trademark) is a technique for defining communication as an end-to-end flow and performing path control, load distribution, optimization, and the like for each flow, and standardization of which has been promoted by a nonprofit organization called Open Networking Foundation (ONF). Specifically, relay apparatuses such as a switching hub (switch) of a data communication path do not analyze and forward each data packet in an autonomous distributed manner, but an apparatus called a controller centrally controls the relay apparatuses.

Open Flow separates a control plane serving as a part for analyzing data, determining a forwarding destination, and controlling determination controlling from a data plane simply serving as a part for physically forwarding a packet. An Open flow controller (OFC) responsible for the former instructs a forwarding rule, and an Open Flow switch (OFS) responsible for the latter performs forwarding based on an instruction of the OFC, specifically, on a flow table of the OFS to which the OFC makes an addition and performs rewrite. This mechanism is used to utilize Open Flow as a tool for controlling the network virtualization.

SDN related techniques such as network virtualization and Open Flow are increasingly utilized in Web/cloud data centers on which communication loads concentrate among IP communication networks, a communication carrier backbone and the like, and flexible optimization control achieves efficiency of communication traffic, reduction in the number of network apparatuses and the like, and reduction in cost and energy and the like. Such a technique called Open Flow has been already known.

Patent Literature 1 discloses a communication method and the like where high-order protocol information is included in a Transmission Control Protocol (TCP) header for the purpose of improving conformability of a computer system and providing a computer system capable of performing flow control corresponding to a higher-order protocol than that of a TCP layer.

SUMMARY OF INVENTION

Technical Problem

When an Open Flow switch (OFS) is connected to a network interface such as a network interface card (NIC) in the same machine, the OFS may intercept all data received by the NIC. As a result, other service or software having normally received and processed data before the OFS is connected to a network interface such as the NIC cannot receive data, and a service or software having conventionally acquired and used specific data from the NIC cannot be normally processed.

In the technique disclosed in Patent Literature 1, flow control viewing a header of communication data is performed. However, other service or software having normally received and processed data before the OFS is connected to a network interface such as the NIC still cannot receive and process data, and a service or software still cannot be normally processed.

In view of the foregoing, the present invention provides a communication path switching apparatus capable of normally executing, even when the OFS is connected to a network interface, a service or software that normally executed without connecting the OFS to network interface.

Solution to Problem

According to example embodiments of the present in there is provided a communication path switching apparatus comprising: an application and that executes a certain function of performing wireless communication with another communication apparatus; a data switching unit that forwards data for causing the application unit to execute the certain function; a control unit that makes setting for causing the data switching unit to forward the data; and a virtual device unit that forwards the data forwarded from the data switching unit to the application unit based on the setting made by the control unit.

Advantageous Effects of Invention

The present invention can provide a communication path switching apparatus capable of normally executing, even when the OFS is connected to a network interface, a service or software that is normally executed without connecting the OFS to a network interface.

BRIEF DESCRIPTION OF DRAWINGS

FIG. 1 is a diagram illustrating a model in which communication functions implemented on a communication path switching apparatus are divided into a hierarchical structure.

FIG. 2A is a diagram illustrating the configuration of a conventional path switching switch.

FIG. 2B is a diagram illustrating the configuration of Open Flow Switching.

FIG. 3 is a diagram illustrating the configuration of a flow table stored in an Open Flow switch (OFS).

FIG. 4 is a diagram illustrating an example of a hardware block that illustrates a schematic configuration of a communication path switching apparatus in accordance with an embodiment of the present invention.

FIG. 5 is a diagram illustrating an example of a function block that illustrates a schematic configuration of the communication path switching apparatus in accordance with the embodiment.

FIG. 6 is a diagram illustrating a specific example that illustrates an outline of a network configuration in a local area network (LAN).

FIG. 7 is a diagram illustrating processing when an information processing apparatus, for example, a personal computer (PC) performs communication using the Transmission Control Protocol (TCP), the Internet Protocol (IP), and the like.

FIG. 8 is a diagram illustrating a frame format in Digital Equipment Corporation/Intel/Xerox (DIX) Ethernet.

FIG. 9 is a diagram illustrating how a packet flows through each layer in the Open System Interconnection (OSI) reference model when a general network interface card (NIC) receives data.

FIG. 10 is a diagram illustrating how a packet flows when the OFS and an Open Flow controller (OFC) are added to FIG. 9.

FIG. 11 is a diagram illustrating how an Extensible Authentication Protocol over LAN (EAPoL) packet flows into specific software and the like through a virtual NIC in the configuration illustrated in FIG. 10.

FIG. 12 is of flowchart illustrating the operation of the communication path switching apparatus in the embodiment.

FIG. 13 is a flowchart illustrating the operation of the communication path switching apparatus in the embodiment.

FIG. 14 is a diagram illustrating the configuration where the NIC is inserted between the OFC and the OFS in the configuration illustrated in FIG. 11.

DESCRIPTION OF EMBODIMENTS

Before the explanation of the embodiment, some explanation is made on Open Flow. Open Flow Switching is a technique for defining communication as an end-to-end flow and separating a control plane serving as a part for analyzing data, determining a forwarding destination determining, and controlling determination from a data plane serving as a part for physically forwarding a packet. In this technique, an Open Flow controller (OFC) controlling processing of the control plane instructs a forwarding destination rule. An Open Flow switch (OFS) responsible for processing of the data plane forwards a packet based on an instruction from the OFC. Specifically, the OFC adds and rewrites a flow entry of the OFS, and the OFS forwards a packet based on the flow entry.

Before these concepts and protocols are described in more detail, the following describes a model in which communication functions implemented on a communication path switching apparatus are divided into a hierarchical structure. FIG. 1 is a diagram illustrating a model in which communication functions implemented on a communication path switching apparatus are divided into a hierarchical structure. This model is the Open System Interconnection (OSI) reference model, and has seven layers from the physical layer that is the first layer to the application layer that is the seventh layer.

The mainstream of a current communication method for exchanging Internet Protocol (IP) packets is a horizontal labor specialization model in which the IP that is the third layer is regarded as a common asset and an interface is defined for each layer, each layer being individually implemented and capable of being replaced with one another. An IP packet based application establishes a session between communication peers with a concept of a port specified by the transport layer that is the fourth layer, and performs data communication of each service.

Examples of a service include the Web, extensible markup language (XML) Web service, mail, messaging, file sharing, and file forwarding illustrated in the fifth layer to the seventh layer in FIG. 1. As long as applications providing the service use the Transmission Control Protocol/Internet Protocol (TCP/IP) and the User Datagram Protocol/IP (UDP/IP) illustrated in the third and the fourth layers, the applications are not necessarily conscious of communication layers of the first and the second layers lower than the third and the fourth layers.

Accordingly, development of Web and cloud services can be accelerated as compared with a vertical integration model such as a conventional telephone switching network. Basically, a communication apparatus can have a general hardware and software configuration for developing the IP packet based communication applications illustrated in FIG. 1.

The following describes a concept of Open Flow Switching capable of being implemented on a communication apparatus. An IP packet transmitted from a communication apparatus reaches a target recipient through each relay apparatus in wire and wireless communication. FIGS. 2A and 2B are diagrams illustrating the configuration of a conventional path switching switch and the configuration of Open Flow Switching, respectively. In the conventional method, as illustrated in FIG. 2A, each relay apparatus performs path control in an autonomous distributed manner and determines a forwarding destination of a packet. In other words, each switch 20 as a relay apparatus has both path control and packet forwarding functions, and executes both processing.

Thus, information on path control is fixed because it is self-learned by each switch 20 and is not notified to other switches. For functions of each switch 20, various kinds of functions developed by an apparatus vendor need to be used, and the functions cannot be customized.

In Open Flow Switching, as illustrated in FIG. 2B, the path control function of each switch 20 is separated and is implemented on an Open Flow controller (OFC) 21, and only the function of forwarding a packet is implemented on each Open Flow switch (OPS) 22 as the switch 20. The OFC 21 controls all information on path control, and this OFC 21 performs central control of the behavior of each OFS 22 so as to enable flexible control.

The above-mentioned description indicates that control can be freely performed with various kinds of conditions up to the fourth layer in the OSI reference model illustrated in FIG. 1. Accordingly, change of lines can be controlled in communication of a Transmission Control Protocol (TCP) port 80 generally used for the Hyper Text Transfer Protocol (HTTP).

The following describes a specific mechanism of Open Flow Switching with reference the schematic diagram illustrated in FIG. 3. FIG. 3 is a diagram illustrating the configuration of a flow table stored in the OFS. The OFS 22 performs processing such as forwarding of a frame based on the information in the flow table illustrated in FIG. 3.

The flow table includes flow entries representing a frame control rule as illustrated in FIG. 3. The flow table includes components for identifying the flow entries and the corresponding three kinds of information that are conditions, statistical information, and processing. The components include fields for inputting "flow entry 1", "flow entry 2", and the like in order to identify each entry. The conditions are header fields and include fields for inputting information illustrated in FIG. 8, which will be described later, in order to identify and specify communication.

The statistical information includes fields for managing how much communication satisfying the conditions occurs and how far processing has proceeded. The processing includes fields for defining processing for a frame. Examples of the processing include forwarding a frame (Forward), enqueueing a frame in a specified queue (Enqueue), dropping a frame (Drop), and modifying a value of a specified field (Modify-Field). Examples also include executing predetermined processing for a specific group (Group), and adding a tag and removing a tag (Push-Tag and Pop-Tag). In addition, processing can be specified in more detail, and in the "Forward" processing, forwarding a frame to all physical ports, encapsulating and sending a frame to a controller, and the like can be specified.

An embodiment of the present invention will now be described with reference to the accompanying drawings. In the drawings, like or corresponding reference numerals indicate like components, and redundant explanation is simplified or omitted as appropriate, following describes the embodiment, but the embodiment is not limited to the one described below. The embodiment described below describes an example where five information processing apparatuses (personal computers (PCs), a tablet, and a smartphone) are connected to a local area network (LAN), but any kinds of and any number of information processing apparatuses may be connected to a LAN.

According to the present invention, when the OFS is used by being connected to a network interface card (NIC) serving as an example of a network interface receiving data from the outside of an apparatus, the OFS forwards a packet to a virtual NIC based on a flow entry setting from the OFC. The present invention has characteristics in that the virtual NIC forwards data to a service or software utilizing specific data through a socket and the like. The characteristics of the present invention will be specifically described with the following drawings.

The following describes a hardware block that illustrates a schematic configuration of a communication path switching apparatus in accordance with the embodiment. FIG. 4 is a diagram illustrating an example of a hardware block that illustrates the schematic configuration of a communication path switching apparatus in accordance with the embodiment.

The communication path switching apparatus in the embodiment includes a central processing unit (CPU) 451, a read only memory (ROM) 452, and a random access memory (RAM) 453. The communication path switching apparatus in the embodiment also includes a hard disk drive (HDD) 454, a display 455, an input apparatus 455, and communication interfaces 458 and 459.

The CPU 451, the ROM 452, the RAM 453, the HDD 454, the display 455, the input apparatus 455, and the communication interfaces 458 and 459 are connected to each other via a bus 460.

The CPU 451 controls operation of the whole communication path switching apparatus. The CPU 451 loads a software program for controlling operation of the communication path switching apparatus from the ROM 452, and executes the software program using the RAM 453 as a working memory. The ROM 452 is a non-volatile memory, and stores therein a boot program and various kinds of computer programs, and data. The RAM 453 is a volatile memory, and temporarily stores therein data input through the communication interfaces, which will be described later. The HDD 454 is a large-capacity non-volatile storage apparatus. The HDD stores therein data to be forwarded and the like.

The input apparatus 456 is an operating of the communication path switching apparatus and is a user interface. Examples of the input apparatus 456 include buttons and a touch panel, and an input apparatus with a light emitting diode (LED), a sensor, and the like. The display 455 includes a liquid crystal display (LCD) and the like, and can be a user interface when the input apparatus 456 has the touch panel configuration.

The communication interfaces 458 and 459 connect a device driver, a layer 2 (L2), an n180211_driver, and the like as described later. The device driver and the L2 are something like packets of Ethernet. The n180211_driver is a driver of a wireless LAN that is an extension of an application program interface (API) for a wireless LAN.

The following describes a function block that illustrates a schematic configuration of the communication path switching apparatus in accordance with the embodiment. FIG. 5 is a diagram illustrating an example of a function block that illustrates a schematic configuration of the communication path switching apparatus accordance with the embodiment.

The communication path switching apparatus in the embodiment includes an application unit 551, a data switching unit 552, a virtual device unit 553, a controller 554, a determining unit 555, and a confirming unit 556. The application unit 551, the data switching unit 552, the virtual device unit 553, the controller 554, the determining unit 555, and the confirming unit 556 are connected to each other via a bus 557. The CPU 451 executes a computer program written into the ROM 452 so as to implement the application unit 551, the data switching unit 552, the virtual device unit 553, the controller 554, and the determining unit 555.

The application unit 551 is application software that executes a certain function, and examples of the application unit 551 include the n180211_driver that is a driver (software) necessary for performing wireless LAN communication such as Wi-Fi. The data switching unit 552 has a function of forwarding data for causing the application unit 55 to execute the certain function, and examples of the data switching unit 552 include the OFS where a flow entry serving as order information such as forwarding of a packet is set. The virtual device unit 553 has a function of forwarding data forwarded from the data switching unit 552 to the application unit 551. Examples of the virtual device unit 553 include the virtual NIC that forwards an Extensible Authentication. Protocol over LAN (EAPoL) packer received by the NIC to the application unit 551.

EAPoL is a protocol used for authenticating wireless communication with another communication apparatus. An EAPoL packet is a protocol that is an extension of Extensible Authentication Protocol (EAP), and the EAPoL packet is a packet used for the EAPoL (protocol).

The controller 554 has a function of making a setting so that the data switching unit 552 forwards data for causing the application unit 551 to execute a certain function. Examples of the controller 554 include the OFC that sets a flow entry serving as order information such as forwarding of a packet the OFS. The determining unit 555 has a function of determining whether data received by the data switching unit 552 is certain data, for example, determining whether the received data is an EAPoL packet. The confirming unit 556 has a function of confirming whether the controller 554 has made a setting for forwarding the data received by the data switching unit 552 when the data is not certain data. For example, when data received by the OFS is not an EAPoL packet, the confirming unit 556 confirms whether a flow entry for forwarding the packet is set in the OFS.

The following describes a specific example that illustrates an outline of a network configuration in a LAN. FIG. 6 is a diagram illustrating a specific example that illustrates an outline of a network configuration in a LAN. In FIG. 6, user terminals such as a PC1 41 and a PC2 42 are connected to a layer 2 (L2) switch 46 by wire. In addition, user terminals such as a tablet computer 44, a smartphone 45, and a PC3 43 are connected to a wireless LAN access point (AP) 48 wirelessly. The L2 switch 46 and the wireless LAN AP 48 are connected to a layer 3 (L3) switch 47 by wire.

The L2 switch 46 represents Ethernet a an example of wire communication in the data link layer that is the second layer in the OSI reference model. The L3 switch 47 represents packet communication based on the IP in the network layer that is the third layer in the OSI reference model.

The following describes processing when an information processing apparatus, for example, a PC performs communication using the TCP, the IP, and the like. FIG. 7 is a diagram illustrating processing when an information processing apparatus, for example, a PC performs Communication using the TCP, the IP, and the like. In FIG. 7, layers (L) in each block such as IP (L3) 503 and IP (L3) 506, and Ethernet (L2) 504 and Ethernet (L2) 505 correspond to respective layers forming the OSI reference model.

In FIG. 7, the right-side block executes transmission processing of data in an application, and the left-side block executes reception processing of the data through media such as a cable and a wireless channel. In the block executing transmission processing, the transmission processing is performed in the order from an application layer (L5 and higher) 501 serving as an upper layer to the Ethernet (L2) 504 serving as a lower layer. In the block executing reception processing, the reception processing is performed in the order from the Ethernet (L2) 505 serving as a lower layer to an application layer (L5 and higher) 508 serving as an upper layer.

Processing of the upper layers such as the application (L5 and higher) 501 and the application (L5 and higher) 508, TCP (L4) 502 and TCP (L4) 507, and the IP (L3) 503 and the IP (L3) 506 is generally executed by software processing using a CPU, a memory, and the like. Processing of lower layers is often executed by dedicated hardware. However, processing of layers may be different depending on the difference in uses, for example, a PC and a server.

The following describes a frame format in Digital Equipment Corporation/Intel/Xerox (DIX) Ethernet. FIG. 8 is a diagram illustrating a frame format in DIX Ethernet. There are a plurality of formats for the Ethernet frame format, but only a typical one is selected and described below.

In FIG. 8, a preamble 61 positioned in the beginning of a frame format. This is a signal for causing an interface connected to a LAN to recognize a start of a frame and for giving a timing to synchronize. In DIX Ethernet, the preamble 61 is a field the size of which is 8 octets (64 bits), and 1 and 0 are alternately continued and the last bit (the 64th bit) is 1 in the field.

A transmission destination address 62 is a field the size of which is 6 octets (48 bits), and sets a media access control (MAC) address of an interface of a station that is a transmission destination. The transmission destination address 62 can set multicast address addressed to a plurality of interfaces. A transmission source address 63 is a field the size of which is 6 octets (48 bits), and sets a MAC address of an interface transmitting a frame.

A type field 54 is a field the size of which is 2 octets (16 bits). The type field 64 sets an identifier that indicates an upper layer protocol stored in the following data field for multiplexing/demultiplexing. For example, if an upper layer protocol is the EAPoL, the type field 64 contains the number 0x888E, and a data field 65 contains an EAP protocol packet. If an upper layer protocol is the Internet Protocol version (IPv) 4, the type field 54 contains the number 0x0800, and the data field 65 contains an IPv4 protocol packet.

The data field 65 can store therein variable length information from the minimum 45 octets to the maximum 1,500 octets. A frame check sequence (FCS) 66 is a 4-octet field for detecting an error of a frame. The FCS 66 sets a cyclic redundancy check (CRC) value calculated from each field of the transmission destination address 62, the transmission source address 63, the type field 64, and the data field 65. Similarly, a CRC value is calculated on a reception side. When the CRC value on a reception side does not match the CRC value of the FCS 66 on a transmission side, it is determines to be an error, and the corresponding frame is dropped.

The following describes how a packet flows through each layer in the OSI reference model when a general NIC receives data. FIG. 9 is a diagram illustrating how a packet flows through each layer in the OSI reference model when a general NIC receives data. The description will be made with a specific example where a wireless LAN card serving as an example of the NIC receives data. An NIC is an abbreviation for a network interface card, but hereinafter, the NIC includes not only a conventional hardware interface but also a software interface.

In the device driver and a layer 2 (the second layer in the OSI reference model, an L2) 702, processing of creating a packet is applied to data received bye an NIC 701. Subsequently, processing is executed in a layer 3 (L3) 703 and a layer 4 (L4) 704. The device driver and the L2 702 execute processing of the L2, and is, for example, something like an Ethernet packet.

For example, in host access point daemon (hostapd), EAPoL packet in the L2 702 is forwarded to an n180211_driver 705 using a socket. The hostapd means open source software implementation for an access point of a wireless LAN and the like. The n180211_driver 705 is a wireless LAN driver that is an extension of an API for a wireless LAN.

While the processing is applied to a packet in the L3 703 and the L4 704, software requiring data from the device driver and the L2 702 receives data and executes processing similarly to the n180211_driver 705. A value of the type field 64 in the frame format illustrated in FIG. 8 may be used for distributing processing from the device driver and the L2 702 to the L3 703 and processing from the device driver and the L2 702 to the n1802.11_driver 705.

The following illustrates how a packet flows when the OFS and the OFC are added to FIG. 9. FIG. 10 is a diagram illustrating how a packet flows when the OFS and the OFC are added to FIG. 9. In other words, an OFS 801 and an OFC 802 are added to the configuration in FIG. 9.

As illustrated in FIG. 10, using the OPS 801 causes data such as a packet, a frame, and the like in communication not to flow into the L3 703 or the n180211_driver 705 indicated by dotted-line paths. All of the data flows into the OFS 801 indicated by a solid-line path 1.

For example, the n18021_driver 705 serving as a driver (software) necessary for implementing a function of a wireless LAN such as Wi-Fi is connected to the OFS 801. Accordingly, all of the information necessary for operating the driver flows into the OFS 801 and fails to be transferred to the n180211_driver 705.

The n180211_driver 705 is in a standby state in order to receive information necessary for operating itself at any time. As described above, the OFS 801 is controlled by the OFC 802 through a path @.

The following describes how an EAPoL packet flows into specific software and the like through a virtual NIC in the configuration illustrated in FIG. 10. FIG. 11 is a diagram illustrating how an EAPoL packet flows into specific software and the like through a virtual NIC the configuration illustrated in FIG. 10.

The EAPoL presented as a specific example is a protocol that is an extension of the EAP, and an EAPoL packet is a packet used for the EAPoL (protocol). The following describes the configuration where an EAPoL packet flows into the n180211_driver 705 through the OFS 801 and a virtual NIC 901 step by step.

As the virtual NIC 901, for example, a TAP device that is a virtual device operating in the L2 is used, and a TUN device that is a virtual device operating in the L3 is also used depending on a processed packet. As described in FIG. 3, the OFC 802 sets a flow entry indicating that all of the data input into the OFS 801 is forwarded to the virtual NIC 901 in a flow table the OFS 801 through the path @. The OFC 802 also changes the setting so that an interface (for example, a socket interface) receiving an EAPoL packet of the n180211_driver 705 receives data transmitted from the virtual NIC 901.

In this manner, all of the EAPoL packets flows into the OFS 801 through the path 1. The OFS 801 forwards all of the input EAPoL packets to the virtual NIC 901 through a path 2. In addition, the n180211_driver 705 receives the EAPoL packets transmitted from the virtual NIC 901 through a path 3. This flow enables an EAPoL packet received by the NIC 701 to be forwarded to application software executing a specific function such as the n180211_driver 705, and the like.

The following describes the operation of the communication path switching apparatus in accordance with the embodiment with reference to the diagram illustrating a flow of an EAPoL packet in FIG. 11. FIGS. 12 and 13 are flowcharts illustrating the operation of the communication path switching apparatus in the embodiment.

In FIG. 12, the communication path switching apparatus is initialized at Step S111. All processing blocks forming the communication path switching apparatus are made to be operable at Step S112. In addition, the OFC 802 presets a flow entry (order information such as forwarding of a packet) to the OFS 801 at Step S113, if necessary.

When the communication path switching apparatus is initialized at Step S121 in FIG. 13, it is determined whether a packet is received at Step S122. If a packet is determined to be received (YES), the process goes to processing at Step S123. If not (NO), the communication path switching apparatus waits until a packet is received.

When a packet is received, processing is performed from a lower layer in layers. Processing from the NIC 701 to the L2 702 illustrated in FIG. 11 is executed at Step S123. The OFS 801 receives data at Step S124. It is determined whether the received data is an EAPoL packet at Step S125. If the data is determined to be an EAPoL packet (YES), the process goes to processing at Step S126. If not (NO), the process goes to processing at Step S129.

The OFS 801 forwards the EAPoL packet to the virtual NIC 901 at Step S126. The virtual NIC 901 forwards the EAPoL packet to the n180211_driver 705 at Step S127. The n180211_driver 705 processes the EAPoL packet at Step S128, and all processing ends. In other words, if data is an EAPoL packet, the packet is forwarded to the OFS 801, the virtual NIC 901, and the n180211_driver 705 in this order based on the flow entry of the OFS 801.

It is confirmed whether the OFC 802 has set a flow entry for forwarding a packet to the OFS 801 at Step S129. If the flow entry is confirmed to be already set (YES), the process goes to processing at Step S130, and if not (NO), the process goes to processing at Step S131.

The packet is forwarded based on the set flow entry at Step S130, and processing ends. The OFS 801 inquires of the OFC 802 for a method of processing a packet, and processing ends at Step S131. Depending on a method of implementing the OFS 801 processing after an inquiry to the OFC 802 and processing for a case where no flow entry is preset to the OFS 801 is performed.

The following describes the configuration where the NIC is inserted between the OFC and the OFS in the configuration illustrated in FIG. 11. FIG. 14 is a diagram illustrating the configuration where the NIC is inserted between the OFC and the OFS in the configuration illustrated in FIG. 11.

In FIG. 14, an NIC 101 is inserted between the OFS 801 and the OFC 802 illustrated in FIG. 11. In this manner, a communication path switching apparatus 100 can be controlled by the OFC 702 provided outside the communication path switching apparatus 100, and the OFC 802 can be provided as an apparatus different from the OFS 801. A specific example can be considered in which something like a wireless LAN AP is assumed as a communication path switching apparatus, and this wireless LAN AP is controlled by the OFC 802 provided outside the wireless LAN AP. It is also assumed that a plurality of communication path switching apparatuses 100 are provided, and these communication path switching apparatuses 100-1, 100-2, . . . , and 100-*n* may be controlled by an order from the single OFC 802 provided outside.

Conventionally, when the OFS is connected to the NIC, the OFS directly takes all of the data from the device driver and the L2. The OFS operates in this manner because it prevents data from flowing into processing of an IP packet such as performed in the L3 and the L4 when the OFS is installed and operated in the operation of the kernel of Linux (registered trademark). When processing of an upper layer (n180211_driver) of a wireless LAN is performed, the OFS often receives data front the device_driver and the L2.

However, the OFS takes all of the data as described above, and the n180211_driver cannot receive data copied from the data, from the OFS. Thus, the OFC sets, to the OFS, a rule for forwarding the data taken by the OFS, and changes the setting of the n180211_driver so that the data is transferred from the virtual NIC to the n180211_driver. In short, data is transmitted to the OFS, and the data passes through the virtual NIC and is forwarded to the n180211_driver again.

Accordingly, only changing the setting of the n180211_driver is required without changing the implementation of the inside of the OFS.

In this manner, in the embodiment, the OFS is connected to the virtual NIC while the OFS is connected to the NIC, and the OFC sets a flow entry to the OFS so that the OFS forwards specific data out of the data received from the NIC to the virtual NIC. The OFC also changes the setting of the n180211_driver so that data is forwarded from the virtual NIC to the n180211_driver. The data is forwarded to the NIC, the OFS, and the virtual NIC in this order, and the virtual NIC forwards the data to a service or software that uses the data. In this manner, even when the OFS and the NIC are connected to each other, processing can be normally executed in a service or software that conventionally acquires specific data from the NIC, and uses and processes the data.

A computer program on a computer can execute the operation flows of the communication path switching apparatus according to the embodiment illustrated in FIGS. 12 and 13. In other words, the CPU 451 integrated in the controller 554 that forms a communication path switching apparatus loads a computer program stored in a storage unit such as the ROM 452. Each processing step in the computer program is sequentially executed so as to execute the operation flows.

The present invention enables a service or software that is normally executed without connecting an OFS to a network interface to be executed even when the OFC is connected to the network interface. Accordingly, the present invention can provide a useful communication path switching apparatus, method for controlling the communication path switching apparatus, and computer program product that cannot be obtained by the conventional technique.

Although the invention has been described with respect to specific embodiments for a complete and clear disclosure, the appended claims are not be thus limited but are to be construed as embodying all modifications and alternative constructions that may occur to one skilled in the art that fairly fall within the basic teaching herein set forth.

REFERENCE SIGNS LIST

20 Switch
21, 802 OFC
22, 801 OFS
41 PC1
42 PC2
43 PC3
44 Tablet computer
45 Smartphone
46 L2 switch
47 L3 switch
48 Wireless LAN AP
61 Preamble
62 Transmission destination address
63 Transmission source address
64 Type field
65 Data field
66 FCS
100, 100-1, 100-2, . . . , and 100-n Communication path switching apparatus
101 NIC
451 CPU
452 ROM
453 RAM
454 HDD
455 Display
456 Input apparatus
458, 459 Communication interface
460, 557 Bus
501, 508 Application (L5 and higher)
502, 507 TCP (L4)
503, 506 IP (L3)
504, 505 Ethernet (L2)
551 Application unit
552 Data switching unit
553 Virtual device unit
554 Controller
555 Determining unit
556 Confirming unit
701 NIC
702 Device driver, L2
703 L3
704 L4
705 n180211_driver
901 Virtual NIC

CITATION LIST

Patent Literature

PTL 1: International Publication 2012/120990

The invention claimed is:

1. A communication path switching apparatus including a communication interface, a processor and a non-transitory computer readable medium storing one or more programs of executable instructions which, when executed by the processor, configures the communication path switching apparatus to include plural software applications or functions to perform a method for controlling a communication path,
said plural software applications or functions including:
a determining function to determine whether received data is authentication data to be used to authenticate wireless communication;
an application software that performs one or more communication functions for wireless communication with a communication apparatus external to the communication path switching apparatus;
a data switching function to forward data for causing the application software to execute one or more of the communication functions;
a controller that sets a setting for causing the data switching function to forward the data; and
a virtual device function that forwards the data from the data switching function to the application software based on the setting set by the controller,
the method comprising:
(a) determining, by the determining function, whether data received via the communication interface from external to the communication path switching apparatus is authentication data for authenticating wireless communication with another communication apparatus;
(b) triggering the data switching function, upon the determining function determining that the data received in (a) is authentication data, and based on the setting set by the controller, to forward the data to the virtual device function, for causing the application software to execute one or more of the communication functions; and
(c) triggering the virtual device function, in response to the data being forwarded in (b) to the virtual device function after having been determined in (a) to be authentication data, and based on the setting set by the controller, to forward the data to the application software, to cause the application software to perform said one or more of the communication functions for wireless communication with another communication apparatus.

2. The communication path switching apparatus according to claim 1, said plural software applications or functions further comprising:
a confirming function that confirms, upon determining by the determining function received data is not authentication data, whether the controller has specified a setting for forwarding data that is not authentication data.

3. The communication path switching apparatus according to claim 2, wherein the data switching function forwards data that is not authentication data, when it is confirmed by the confirming function that the setting for forwarding data that is not authentication data has been set by the controller, based on the setting for forwarding data that is not authentication data.

4. The communication path switching apparatus according to claim 3, wherein the data switching function requests the controller, when it is confirmed iy the confirming function that no setting for forwarding data that is not authentication data has been set by the controller, for a method of processing data that is not authentication data.

5. The communication path switching apparatus according to claim 1, wherein the data switching function forwards the data received from the communication interface to another communication interface provided in the communication path switching apparatus.

6. The communication path switching apparatus according to claim 5, wherein another controller is provided external to the communication path switching apparatus, said another controller is connected to said another communication interface and is provided in another apparatus external to the communication path switching apparatus, and said another controller controls operation of the communication path switching apparatus from external to the communication path switching apparatus.

7. A method for controlling a communication path switching apparatus, the communication path switching apparatus including a communication interface, a processor and a non-transitory computer readable medium storing one or more programs of executable instructions which, when executed by the processor, configures the communication path switching apparatus to include plural software applications or functions to perform the method for controlling the communication path,
said plural software applications or functions including:
a determining function to determine whether received data is authentication data to be used to authenticate wireless communication;
an application software that performs one or more communication functions for wireless communication with a communication apparatus external to the communication path switching apparatus;
a data switching function to forward data for causing the application software to execute one or more of the communication functions;
a controller that sets a setting for causing the data switching function to forward the data; and
a virtual device function that forwards the data from the data switching function to the application software based on the setting set by the controller,
the method for controlling the communication path switching apparatus comprising:
(a) determining, by the determining function, whether data received via the communication interface from external to the communication path switching apparatus is authentication data for authenticating wireless communication with another communication apparatus;
(b) triggering the data switching function, upon the determining function determining that the data received in (a) is authentication data, and based on the setting set by the controller, to forward the data to the virtual device function, for causing the application software to execute one or more of the communication functions; and
(c) triggering the virtual device function, in response to the data being forwarded in (b) to the virtual device function after having been determined in (a) to be authentication data, and based on the setting set by the controller, to forward the data to the application software, to cause the application software to perform said one or more of the communication functions for wireless communication with another communication apparatus.

8. A computer program product comprising a non-transitory computer-usable medium having a computer program that causes a computer in a communication path switching apparatus to perform a method for controlling a communication path, the communication path switching apparatus including a communication interface, and the computer including a processor and a non-transitory computer readable medium storing one or more programs of executable instructions which, when executed by the processor, configures the communication path switching apparatus to include plural software applications or functions,
said plural software applications or functions including:
a determining function to determine whether received data is authentication data to be used to authenticate wireless communication;
an application software that performs one or more communication functions for wireless communication with a communication apparatus external to the communication path switching apparatus;
a data switching function to forward data for causing the application software to execute one or more of the communication functions;
a controller that sets a setting for causing the data switching function to forward the data; and
a virtual device function that forwards the data from the data switching function to the application software based on the setting set by the controller,
the method for controlling the communication path switching apparatus comprising:
(a) determining, by the determining function, whether data received via the communication interface from external to the communication path switching apparatus is authentication data for authenticating wireless communication with another communication apparatus;
(b) triggering the data switching function, upon the determining function determining that the data received in (a) is authentication data, and based on the setting set by the controller, to forward the data to the virtual device function, for causing the application software to execute one or more of the communication functions; and (c) triggering the virtual device function, in response to the data being forwarded in (b) to the virtual device function after having been determined in (a) to be authentication data, and based on the setting set by the controller, to forward the data to the application software, to cause the application software to perform said one or more of the communication functions for wireless communication with another communication apparatus.

* * * * *